United States Patent
Huang et al.

(10) Patent No.: US 8,045,459 B2
(45) Date of Patent: Oct. 25, 2011

(54) PACKET PROCESSING METHOD FOR WIRELESS COMMUNICATIONS

(75) Inventors: Shiao-Hwa Huang, Taichung (TW); Yu-Chang Tsai, Taichung Hsien (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 793 days.

(21) Appl. No.: 12/144,426

(22) Filed: Jun. 23, 2008

(65) Prior Publication Data

US 2009/0190512 A1   Jul. 30, 2009

(30) Foreign Application Priority Data

Jan. 25, 2008   (CN) .......................... 2008 1 0008925

(51) Int. Cl.
*H03M 13/00* (2006.01)
(52) U.S. Cl. ........ 370/230; 714/701; 714/715; 714/752; 714/776; 714/758; 375/240.27; 370/230.1; 370/231; 370/235; 370/328
(58) Field of Classification Search .................. 714/701, 714/715, 752, 758, 819; 375/240.27; 370/328, 370/338, 230.1, 231, 235, 470–477
See application file for complete search history.

(56) References Cited

U.S. PATENT DOCUMENTS

| | | | |
|---|---|---|---|
| 6,802,038 B1 * | 10/2004 | Yu ................................. | 714/758 |
| 2003/0103480 A1 * | 6/2003 | You et al. ...................... | 370/335 |
| 2003/0192004 A1 * | 10/2003 | Gopalakrishnan ............ | 714/758 |
| 2007/0011561 A1 * | 1/2007 | Ambilkar et al. ............. | 714/758 |

* cited by examiner

*Primary Examiner* — Ian N Moore
*Assistant Examiner* — Tam Phan
(74) *Attorney, Agent, or Firm* — Browdy and Neimark, PLLC

(57) ABSTRACT

A packet processing method used in a wireless communication is disclosed to have the packet data not to contain the identification code of the transmitter and to let the receiver read out the correct identification code of the transmitter and verify the effectiveness of the data, assuring excellent confidentiality of the data, reducing packet size, maintaining packet data integrity, extending wireless communication distance and saving power consumption. Under the fix bit error rate, the invention effectively reduces the chance of erroneous data and lowers the current loading to the battery of each of the transmitter and the receiver.

11 Claims, 2 Drawing Sheets

PACKET PROCESSING METHOD FOR WIRELESS COMMUNICATIONS

BACKGROUND OF THE INVENTION

1. Field of the Invention

The present invention relates to data packet processing and more particularly, to a packet processing method for use in a wireless packet transmission.

2. Description of the Related Art

In wireless digital communications, a corresponding error detection and control measure is employed to assure high speed and high reliability data transmission. This measure includes an error detection and correction method in which a check code is transmitted with the data to the receiver, and the receiver checks the correctness of the received data. If each data does not occupy much communication bit space and short packet data format is employed to mach the error check for transmission processing, the digital communication can have high speed and high reliability characteristics. However, under the fast development step of information technology, if the data occupies a long bit space, shortening the signal transmission processing time in order to achieve signal transmission rapidly in time may narrow the signal waveform, relatively increasing the chance of bit transmission error. Any interference of the transmission medium or external noises during the transmission may relatively increase the chance of error.

For example, in all error check processing methods, a CRC (Cyclic Redundancy Check) is an easy way to analyze mathematically, and good at detecting common errors caused by noise in transmission channels. A CRC is method of checking for errors in data that has been transmitted on a communications link. The dividend polynomial is initially preset to 0, and the 1s and 0s of the data stream become the coefficients of the dividend polynomial. The division uses subtraction modulo 2 (no carries), and the remainder is transmitted as the error check field. The receiving station compares the transmitted remainder with its own computed remainder, and an equal condition indicates that no error has occurred. The polynomial value depends on the protocol and code set being used. In other words, the higher the order of the polynomial value is, the lower the chance of error in the CRC will be. However, because the transmission of a long data requires a higher order of CRC to avoid detection error, the transmission signal waveform needs to carry a long data, lowering the data transmission speed. Unless a circuit processing device of high transmitting power is used to improve the transmission speed and to compensate the increasing of bit error rate due to lowering of the bit width, the effective energy transmission distance of the wireless communication will be limited, and the chance of packet collision will increase, resulting in a detection error and data error.

SUMMARY OF THE INVENTION

The present invention has been accomplished under the circumstances in view. It: is therefore one object of the present invention to provide a packet processing method for use in a wireless communication that reduces the packet length and effectively recognizes all the communication data content by means of low-power wireless transmission.

To achieve this and other objects of the present invention, the packet processing method runs a transmitter processing program and a receiver processing program. The transmitter processing program is to run the identification code and the data to be transmitted through an arithmetic modulo operation, for example, cyclic redundancy check, and then to combine the data and the modulus obtained from the arithmetic modulo operation for running with identification code through a logic operation, and then to transmit the logic result value to the receiver in the form of a wireless packet. Upon receipt of the wireless packet, the receiver processing program determines the data content of the received packet to be in conformity with a predetermined length, and then runs one reference data of built-in recognition data group with the packet content through a logic operation, and then combines the reference data and the logic value and runs the combined data through the same arithmetic modulo operation to obtain a modulus, and then determines the reference data to be in conformity with the identification code data when the modulus is zero. According to the packet processing method of the present invention, the packet transmitted by the transmitter carries the modulus check value without containing the identification code of the transmitter, and the receiver can effectively check the effectiveness of the received data. Therefore, the invention has the characteristics of assuring excellent confidentiality of the data, reducing packet length, maintaining packet data integrity, extending wireless communication distance and saving power consumption. Under the same bit error rate, the invention effectively reduces the chance of erroneous bit and lowers the pulse current load of the battery.

DETAILED DESCRIPTION OF THE INVENTION

Figure 1:
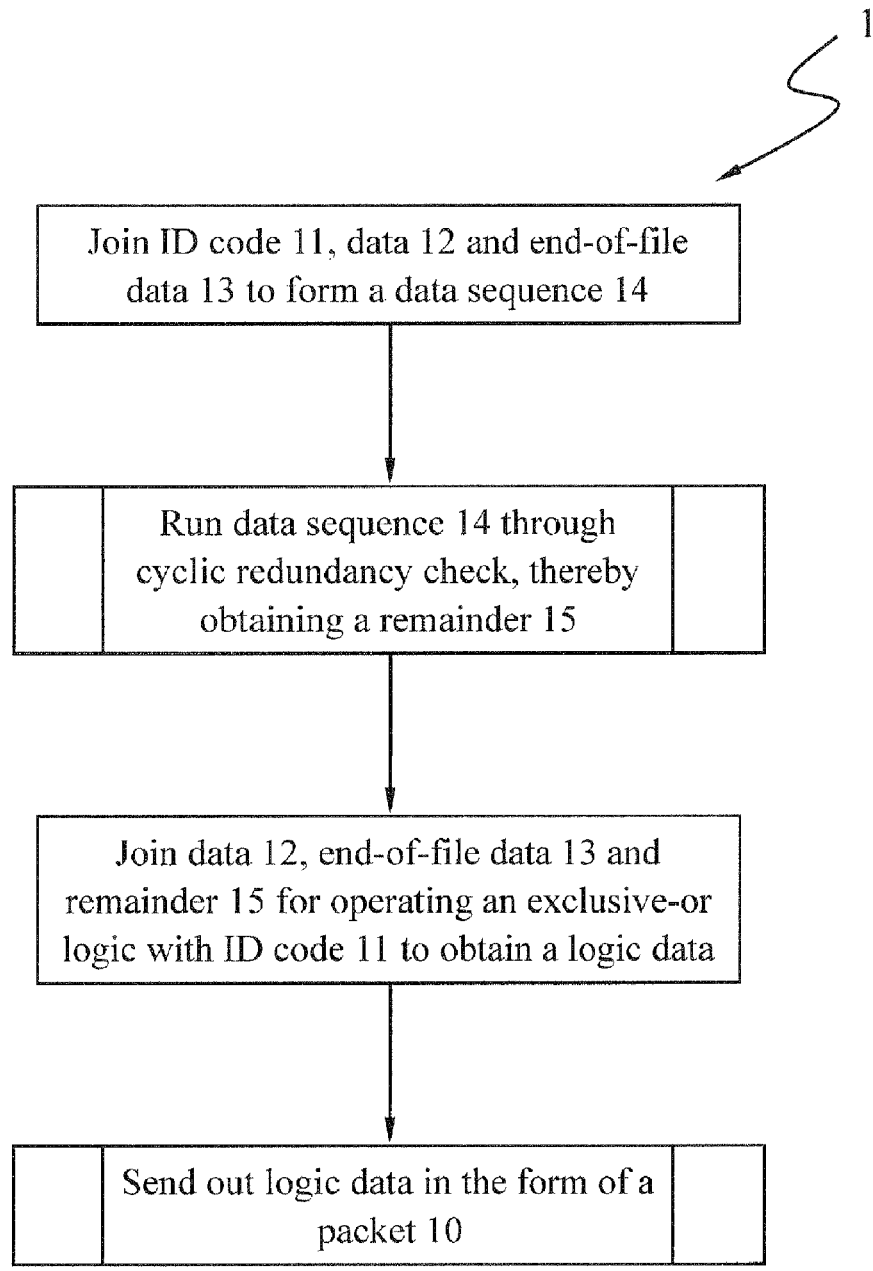
FIG. 1 is a block diagram showing the data processing flow at the transmitter according to the preferred embodiment of the present invention.
Figure 2:
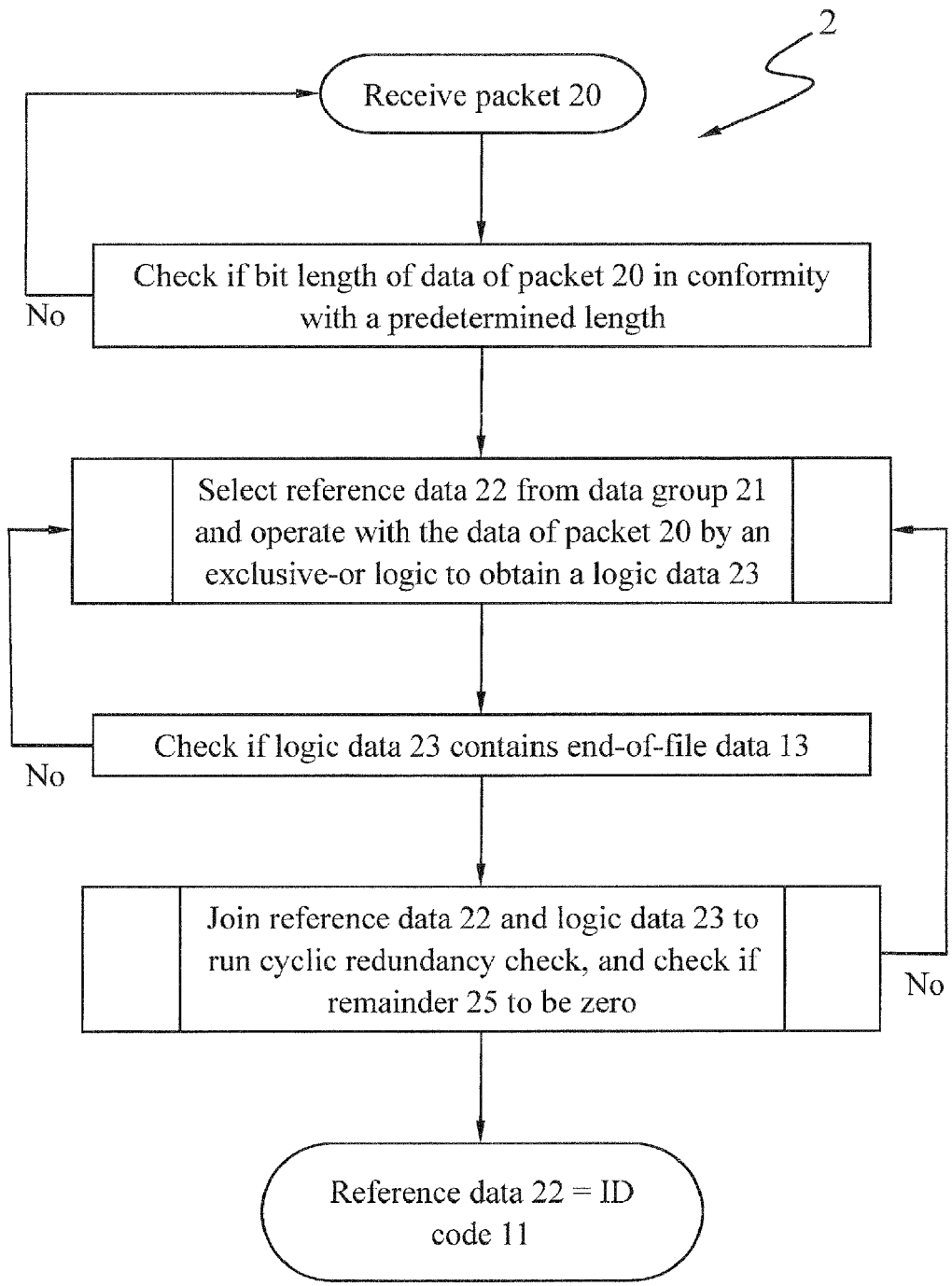
FIG. 2 is a block diagram showing the data processing flow at the receiver according to the preferred embodiment of the present invention.

Referring to FIGS. 1 and 2, showing a packet processing method for wireless communication in accordance with the present invention which provides a processing program 1 embedded in a transmitter addressing as a long ID code 11 and containing a plurality of data 12 prepared for sending to a receiver. The processing program 1 is running to have the a packet 10 sent to the receiver without carrying the ID code 11, while allowing the receiver to verify and read out the ID code 11 and the data 12 after receiving the packet 10. The processing program 1 in the transmitter runs subject to the following steps:

1a. Storing the ID code 11 and joining with the data 12 and then an end-of-file data 13 to the end bit of the data 12 to form a data sequence 14;

1b. Running a cyclic redundancy check of moduloing the data sequence 14 by a predetermined generator polynomial according to the bit length of the data sequence 14, thereby obtaining a remainder 15;

1c. Joining the data 12, the end-of-file data 13, and the remainder 15 to form a data sequence 16; and 1d. Operating the data sequence 16 with the ID code 11 by an exclusive-or logic (XOR) to obtain a logic data formatted to the packet 10 for wireless communication.

After processed through a RF circuit, the transmitter sends the packet 10 to the receiver carried by a RF signal. After a RF circuit of the receiver discriminates a packet 20 from the received RF signal, a processing program 2 built in the receiver processes the packet 20 subject to the following steps:

2a. Checking whether the bit length of data formatted in the packet 20 subjects to a pre-defined length, and then stop the processing process if the checking result is negative;

2b. Fetching a data group 21 from a database that contains multiple pre-defined ID reference data 22, and then selecting one reference data 22 to operate with the data of the packet 20 by an exclusive-or logic to obtain a logic data 23;

2c. Checking whether the logic data 23 contains the end-of-file data 13, and then returning to step 2b to select another reference data 22 if the checking result is negative;

2d. Joining the selected reference data 22 and the logic data 23 to form a data sequence 24;

2e. Running a cyclic redundancy check of moduloing the data sequence 24 by the same generator polynomial, thereby obtaining a remainder 25;

2f. Determining whether the remainder 25 is zero, and then returning to step 2b to select another reference data 22 if the checking result is negative. If the remainder 25 is determined to be zero, it means that the selected reference data 22 is the ID code 11 and the logic data 23 contains the data 12. Further, other redundancy checks, for example, checksum used to increase the amount of redundancy may be employed during running of the processing program 1 or 2, achieving the equivalent effect as the cyclic redundancy check. With respect to logic operations, addition, subtraction or exclusive-nor logic that has logically complementary characteristics after operating twice within the transmitter and the receiver can be used to substitute for the exclusive-or logic and achieving the same effect.

In a multi-transmission communication system, the packet 10 formatted subject to the aforesaid packet processing method envelops data without the ID code 11 addressed respective one of the transmitters of the system, and a single receiver can effectively recognize the data corresponding to the address of the respective transmitter and verify the received integrity according to the check result in high-level redundancy check like CRC, assuring excellent confidentiality of the data. During the cyclic redundancy check, the higher the degree of the generator polynomial is the lower the bit-error-rate in received data will be. The packet processing method of the present invention effectively saves about 50% of the packet size when the ID code defined by each transmitter has a bit length greater than the transmitted data, not only maintaining integrity of the packet rapidly transmitted in the effective bandwidth of radio frequency during RF signal processing to assure high receiving rate and to reduce the chance of packet collision, but also extending RF transmission distance to save power consumption during RF receiving and transmitting so as to decrease circuit power dissipation. That is, under the fix bit error rate, the invention effectively reduces the chance of erroneous data and lowers the current loading to the battery of each of the transmitters and the receiver.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A packet processing method used in a wireless communication, comprising the steps of:
   a) running a modulo operation for a message to obtain a first modulus, the message including a set of first data and multiple second data;
   b) joining said multiple second data and said first modulus to run a logical operation with said first data to obtain a first logic data;
   c) transmitting said first logic data as a packet to a wireless receiver, receiving said packet at said wireless receiver, said wireless receiver having built therein a database containing a plurality of reference data;
   d) selecting one reference data from said database to run a logical operation with data formatted in the received packet to obtain a second logic data;
   e) joining the selected reference data and said second logic data to run a modulo operation to obtain a second modulus; and
   f) determining the selected reference data to be the same as the first data and the second logic data in step e) containing said multiple second data when said second modulus is zero;
   g) wherein said modulo operation employed during step a) and step e) is a cyclic redundancy check;
   h) wherein the degree of a generator polynomial provided to the cyclic redundancy check during step a) and step e) is greater than or equal to the number of bits of said first data and said multiple second data.

2. The packet processing method as claimed in claim 1, wherein the number of bits of said first modulus obtained during step a) is greater than that of said first data.

3. The packet processing method as claimed in claim 1, wherein said first modulus is joined to the end bit of said multiple second data to run the logical operation during step b).

4. The packet processing method as claimed in claim 1 wherein the logical operation employed during step b) is selected from the group consisting of exclusive-or logic, exclusive-nor logic, addition logic, and subtraction logic.

5. The packet processing method as claimed in claim 4, wherein the logical operation employed during step d) is the same as the logical operation employed during step b).

6. The packet processing method as claimed in claim 1, further comprising a sub-step processed in the wireless receiver to check whether the bit length of the data formatted in the packet is matched with said first logic data before step d), and then proceeding back to step c) for receiving another packet when the check result is negative.

7. The packet processing method as claimed in claim 1, further comprising a sub-step of returning to step d) and selecting another reference data from said database for the logical operation when said second modulus is not zero before step f).

8. The packet processing method as claimed in claim 1, wherein said first data is an identification code by which the wireless receiver identifies the address of a transmitter where sending out the packet.

9. A packet processing method used in a wireless communication, comprising the steps of:
   a) running a modulo operation for a message to obtain a first modulus, the message including a set of first data and multiple second data;
   b) joining said multiple second data and said first modulus to run a logical operation with said first data to obtain a first logic data;
   c) transmitting said first logic data as a packet to a wireless receiver, receiving said packet at said wireless receiver, said wireless receiver having built therein a database containing a plurality of reference data;
   d) selecting one reference data from said database to run a logical operation with data formatted in the received packet to obtain a second logic data;

e) joining the selected reference data and said second logic data to run a modulo operation to obtain a second modulus; and f) determining the selected reference data to be the same as the first data and the second logic data in step e) containing said multiple second data when said second modulus is zero;

g) wherein the multiple second data including an end-of-file data that is located on the end bit of said first data and said multiple second data when running the modulo operation during step.

10. The packet processing method as claimed in claim 9, further comprising a sub-step of checking whether the end bit of said second logic data is said end-of-file data before step e), and then returning to step d) to select another reference data from said database to run the logical operation when the checking result is negative.

11. The packet processing method as claimed in claim 10, wherein said end-of-file data is located on the end bit of said multiple second data during step b).

* * * * *